United States Patent [19]
Tsumori et al.

[11] 4,015,084
[45] Mar. 29, 1977

[54] PROTECTIVE DEVICE FOR INDUCTION HEATING APPARATUS

[75] Inventors: Akihiro Tsumori, Shizuoka; Kenji Shima, Amagasaki, both of Japan

[73] Assignee: Mitsubishi Denki Kabushiki Kaisha, Tokyo, Japan

[22] Filed: May 30, 1975

[21] Appl. No.: 582,154

[30] Foreign Application Priority Data

July 15, 1974 Japan .................. 49-83619
Mar. 6, 1975 Japan .................. 50-27667

[52] U.S. Cl. ..................... 219/10.49; 219/10.77
[51] Int. Cl.² ................................. H05B 5/04
[58] Field of Search ........ 219/10.49, 10.77, 10.75, 219/10.79, 69 C, 131; 307/75, 80, 81, 86; 317/12, 53, 137

[56] References Cited
UNITED STATES PATENTS

| | | | |
|---|---|---|---|
| 3,532,850 | 10/1970 | Schulz et al. | 219/69 C |
| 3,604,882 | 9/1971 | Seyfried | 219/10.77 X |
| 3,770,928 | 11/1973 | Koanrumpf et al. | 219/10.49 |
| 3,821,509 | 6/1974 | Amagami et al. | 219/10.77 |
| 3,823,297 | 7/1974 | Cunningham | 219/10.77 |
| 3,973,105 | 8/1976 | Tsumori | 219/10.49 |

*Primary Examiner*—Bruce A. Reynolds
*Attorney, Agent, or Firm*—Oblon, Fisher, Spivak, McClelland & Maier

[57] ABSTRACT

A protective device for induction heating apparatus is disclosed. The device includes an excitor supplied with operating voltage for induction-heating a heating element and a detecting device for detecting the state of the heating element. Means are provided for stopping the operating voltage to the excitor when the detecting device detects an abnormal state of the heating element and for applying the operating voltage to the excitor after a predetermined delay when an abnormal state of the heating element is not detected.

2 Claims, 8 Drawing Figures

F I G. 6
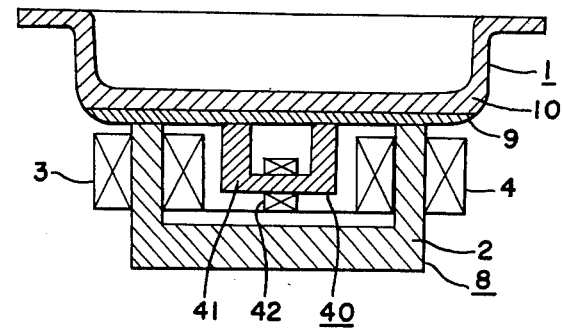
F I G. 7
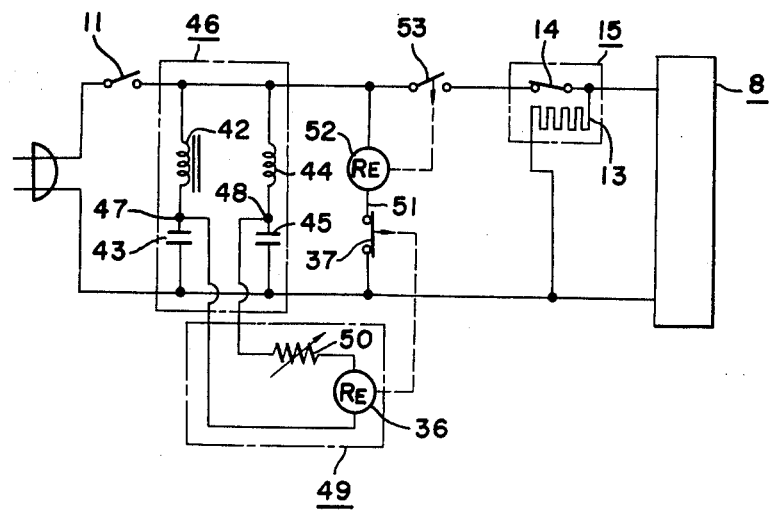

PROTECTIVE DEVICE FOR INDUCTION HEATING APPARATUS

BACKGROUND OF THE INVENTION

The present invention relates to a protective device for an induction heating apparatus used for cooking by utilizing heat from electromagnetic induction.

The induction heating apparatus utilizing low frequency comprises a heating element such as a specific cooking pot and an excitor for heating the specific cooking pot. The excitor includes at least two groups of magnetic circuits and a capacitor having a specific value connected in series to one group of excitation windings so as to pass a current having a predetermined phase difference from the current passing through the other group of excitation windings to decrease noise and vibration of the cooking pot.

In comparison with the operation of the induction heating apparatus with the specific cooking pot on the excitor, an equivalent resistance of the magnetic circuit is lower during operation without the specific cooking pot. Accordingly, both the absolute value and the phase of the current passing through the magnetic circuit are changed.

In this case, the current passing through the capacitor is increased and the phase is a leading one. A similar result occurs when an undesirable cooking pot is placed on the excitor. Even though the specific cooking pot is placed on the excitor in a normal state, if the pot is heated to a very high temperature such as heating the pot when it is empty, the terminal voltage of the capacitor is also changed.

The inventors have studied and proposed a protective device for overcoming these difficulties and for preventing an accident during an abnormal condition. This protective device is disclosed in prior applications:
U.S. patent application Ser. No. 514,782, filed Oct. 15, 1974, now U.S. Pat. No. 3,973,105,
British patent application Ser. No. 46123/74,
French patent application Ser. No. 7435160, and
Swedish patent application Ser. No. 7413364-6.

In accordance with the protective device, a change of the terminal voltage of the capacitor in an abnormal state is detected by the detecting circuit and the relay of the breaking drive circuit is operated by the output of the detecting circuit to actuate the relay of the breaking circuit whereby the operating voltage applied to the excitor is cut off.

However, in the protective device disclosed in the prior applications, the power voltage of the operating voltage is applied directly to the excitation windings of the excitor. Accordingly, if a cooking pot user places the cooking pot above the excitor when the power voltage is applied, a high attractive force is applied suddenly to the cooking pot. This can cause the cooking pot to be dropped by a startled user. This is especially disadvantageous when the cooking pot contains the food to be cooked.

SUMMARY OF THE INVENTION

It is an object of the invention to provide an improved protective device for an induction heating apparatus which overcomes the above-mentioned difficulties by detecting the conditions of absence of a heating element, i.e., absence of a cooking pot on the excitor, an unsuitable type of heating element and an abnormally high temperature of the heating element, and preventing abnormal operation of the induction heating apparatus.

It is another object of the invention to provide a protective device wherein a power voltage of an operating voltage is not directly applied to the excitor when the power switch is turned on, but rather is applied after detecting the normal position of a suitable heating element.

It is another object of the invention to provide a protective device which affords enough time for placing the heating element on the excitor in a normal state without immediate application of the operating voltage to the excitor when an abnormal condition in the power connection is eliminated.

It is still another object of the invention to provide a protective device wherein, when the heating element is in an OFF state by virtue of a heat adjusting switch having a duty cycle for adjusting the heat, the operating voltage is not applied to the excitor even though the heat adjusting switch is turned on.

The foregoing and other objects are attained in accordance with one aspect of the present invention through the provision of a protective device for induction heating apparatus which includes an excitor supplied with operating voltage for induction-heating a heating element and a detecting device for detecting the state of the heating element. Means are provided for stopping the operating voltage to the excitor when the detecting device detects an abnormal state of the heating element and for applying the operating voltage to the excitor after a predetermined delay when an abnormal state of the heating element is not detected.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 6 is a sectional view of another embodiment of the induction heating apparatus according to the invention;

FIG. 7 is a diagram of an electrical circuit of the induction heating apparatus equipped with the protective device of FIG. 6.

DETAILED DESCRIPTION OF A PREFERRED EMBODIMENT

Figure 1:
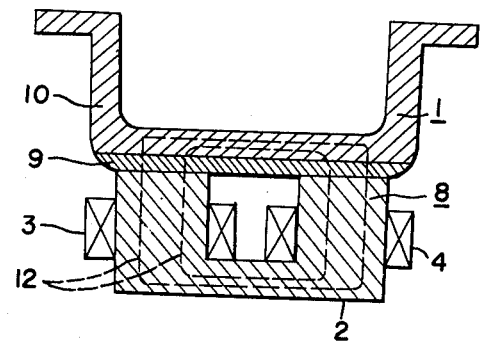
FIG. 1 is a sectional view showing the principle of operation of an induction heating apparatus.
Figure 2:
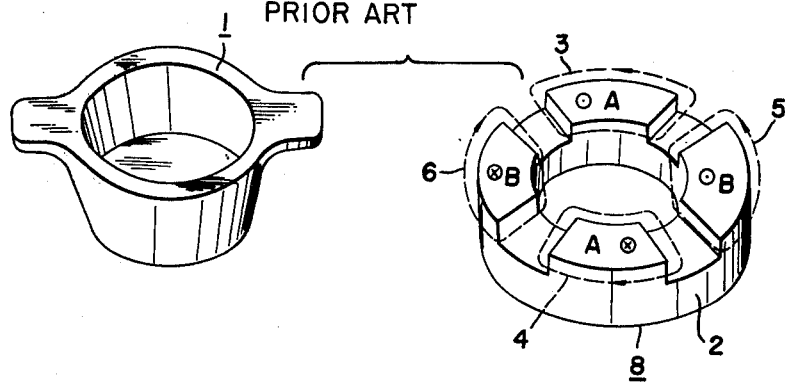
FIG. 2 is a schematic view of a heating element and an excitation core of the induction heating apparatus of FIG. 1.
Figure 3:
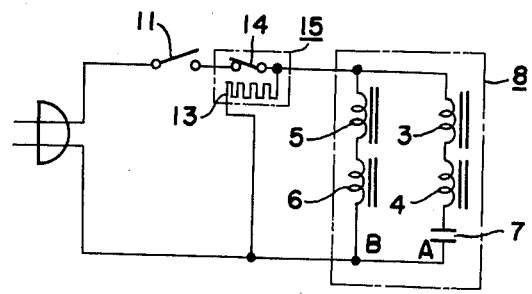
FIG. 3 is a diagram of a basic electrical circuit for the induction heating apparatus.

Referring now to the drawings, wherein like reference numerals designate identical or corresponding parts through the several views, and more particularly to FIGS. 1–3, the induction heating apparatus comprises excitation cores 2 wound by excitation windings 3, 4, 5, 6 which are separated to form two groups of exciting circuits A, B; a capacitor 7 having a specific value connected in series to one group of the excitation windings 3, 4 so as to pass current having a certain phase difference from the current passing through the other group of excitation windings 5, 6; and a heating element 1 such as a cooking apparatus, e.g., a specific cooking pot which has a bottom plied plate (or alloy, etc.) made of non-magnetic conductive metal 9, e.g., copper or aluminum and ferromagnetic metal 10, e.g., iron. Water, food or the like in the cooking apparatUs is heated by eddy current loss resulting from the alternating magnetic flux 12 generated by the excitor 8.

The result of placing or not placing the specific cooking pot on the excitor 8 of the induction heating apparatus will now be considered. When the specific pot 1 is not placed on the excitor 8, the equivalent resistances of the exciting circuits A, B are decreased to about 10 percent. Accordingly, both the absolute value and phase of the current passing through the exciting circuit are changed. The current passed to the capacitor 7 is increased 1.5 times and the phase of current still leads by about 40°.

When a pot other than the required cooking pot is used, a similar phenomenon occurs. Even when the required cooking pot 1 is placed in its normal position, if the temperature of the cooking pot rises to too high a temperature, the terminal voltage of the capacitor 7 changes under similar conditions.

Figure 4:
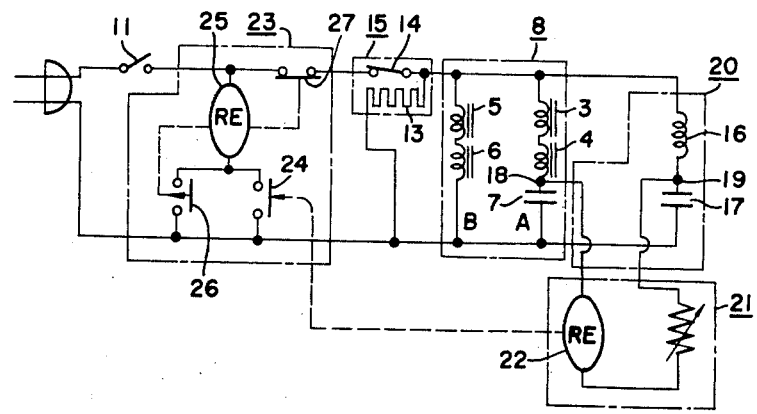
FIG. 4 is a diagram of an electrical circuit of the induction heating apparatus equipped with a protective device.

A previous protecting device of the inventors is shown in the circuit of FIG. 4 wherein the reference 16 designates a mimic winding which has substantially the same power-factor as the excitation windings 3, 4 in a normal condition; 17 designates a capacitor which is connected in series to the mimic winding 16 so as to provide a phase substantially equal to that of the current passing through the excitation windings 3, 4.

Accordingly, the change of current passing through excitation windings 3, 4 causes a voltage change which is applied between the output terminal 18 (between the excitation windings 3, 4 and the capacitor 7) and the output terminal 19 (between the mimic winding 16 and the capacitor 17). This voltage change differs depending upon the placing of the specific cooking pot 1 on the excitor 8 or not or the using of a pot other than the specific cooking pot.

Even when the specific cooking pot 1 is used, if the temperature of the pot rises too high, a large voltage change occurs. Accordingly, the relay 22 of the breaking drive circuit 21 is actuated by the voltage of the detecting circuit 20 to turn on the normally OFF contact 24. Accordingly, the relay 25 is actuated and is self sustained by the contact 26 and the normal ON contact 27 is turned off to open the main circuit whereby an accident during abnormal operation is prevented by the protecting mechanism.

However, in the previously referred to protecting mechanism, the power voltage is directly applied to the excitation windings 3, 4. Accordingly, if a user of operator holds the cooking pot 1 above the excitor 8 when the power voltage is applied, a high attractive force is applied suddenly to the cooking pot. Accordingly, the operator may be startled causing the operator to permit the cooking pot to fall. The cooking pot is also moved by the attractive force when the cooking pot is not placed at its normal position. Accordingly, a safety problem exists and should be considered, especially, if the cooking pot contains food to be cooked.

When the heat adjustment of the induction heating apparatus is performed by changing the duty cycle, that is the ON-OFF ratio for about 40 seconds in one cycle by a heat adjusting switch 15 which is a bimetal element which includes a heater 13 as shown in FIGS. 3 and 4, the excitor 8 may not be actuated under the operation of the heat adjusting switch 15 even during normal operation. If the cooking pot 1 is placed above the excitor 8 during the time of inactivation of the excitor, a high attractive force may suddenly be applied to the cooking pot 1 at the moment the excitor is turned on causing the operator to drop the cooking pot 1.

The present invention is to overcome the above-mentioned difficulties and to provide a protective device which prevents abnormal operation of the induction heating apparatus by detecting the absence of placement of the heating element on the exciter, an unsuitable type of heating element and a temperature higher than a predetermined temperature caused by heating an empty cooking pot and which does not immediately apply the operating voltage to the excitor even though the switch is turned on to apply the power.

Figure 5:
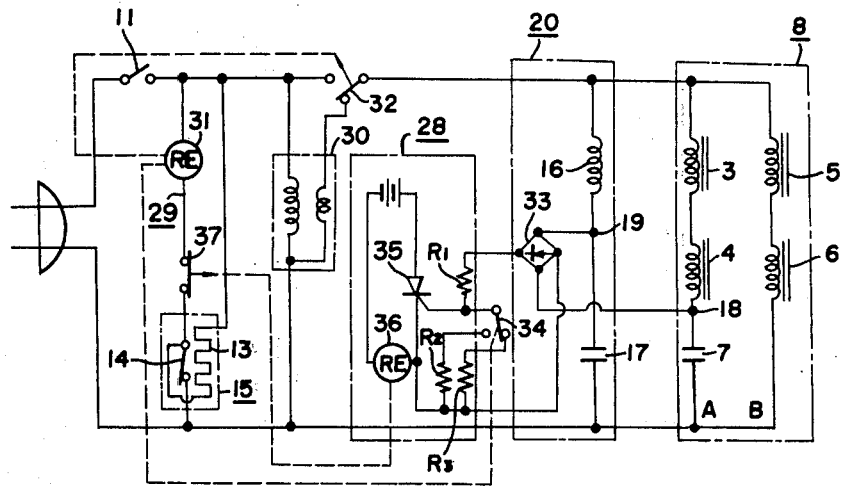
FIG. 5 is a diagram of an electrical circuit of the induction heating apparatus equipped with the protective device according to the invention.

Referring to FIG. 5, one embodiment of the protective device according to the invention is illustrated. In FIG. 5, the reference 8 designates an excitor; 20 designates a detecting circuit; 28 designates a delay relay driving circuit for voltage switching; 29 designates a delay relay circuit for voltage switching which is controlled by the delay relay driving circuit 28; and 30 designates a dropping transformer.

In the embodiment of FIG. 5, when a main switch 11 is turned on, the power voltage is applied to the primary side of dropping transformer 30, and the low voltage generated in the secondary side is usually applied through a monopolar double throw switch 32 of a delay relay for voltage switching to the excitor 8 and the detecting circuit 20. Simultaneously, the power voltage is applied to the delay relay for voltage switching 31 since the switch 37 for breaking the delay relay circuit for voltage switching 29 is in its normal ON condition.

However, the delay relay is not actuated before the finish of the delay time. Prior to the finish of the delay time, a determination is made whether the delay relay driving circuit for voltage switching 28 should be actuated or not depending upon the voltage detected by the detecting circuit 20.

When the cooking pot 1 is not placed at its normal position on the excitor 8, or an undesirable cooking pot made of copper or aluminum is used or the temperature of the cooking pot is higher than a predetermined temperature, the output voltage between the output terminal 18 of the excitor 8 and the output terminal 19 of the detecting circuit 20 is rectified by a diode bridge 33 and is shunted by shunt resistances $R_1$ and $R_2$ through the other monopolar double throw switch 34 of the delay relay for voltage switch 31 to turn on a switch element (thyristor or transistor) (in FIG. 5, a thyristor is used).

In the case of a thyristor, the protective circuit is self-sustained even if the pot is normally replaced on the excitor 8. However, in the case of a transistor, the protective circuit is not self-sustained. Therefore if the pot is normally replaced on the excitor 8, the protective circuit returns to normal operation. The relay 36 of the driving circuit 28 is actuated to turn off the switch 37. Accordingly, the delay relay 31 is not actuated and the switches 32, 34 are maintained connected to the dropped low voltage side, and the operating voltage of the power voltage is not applied to the excitor 8.

When a suitable cooking pot is placed in a normal position on the excitor and the temperature is lower than the predetermined temperature, the drive circuit 28 is not actuated. Accordingly, the delay relay 31 is actuated after a predetermined delay time, and the switches 32, 34 are switched to directly apply the operation voltage of the power voltage. The output voltage of the detecting circuit 20 is changed in order to operate with the power voltage.

During normal operation, if an abnormal condition such as an abnormal rise of temperature of the cooking pot 1 caused by cooking with an empty pot occurs, the output voltage of the detecting circuit 20 is shunted by the shunt resistances $R_1$ and $R_2$ to actuate the drive circuit 28 whereby the delay relay 31 is deactuated and the switches 32, 34 are connected to the low voltage side and the power voltage is not applied to the excitor 8 and the detecting circuit 20 is also operated by the low voltage.

When the heat adjusting switch 15 is turned off in a normal operation state, the switches 32, 34 are switched to the dropped low voltage side whereby the current to the excitor 8 is so small that the cooking pot 1 can easily be raised up. When the cooking pot 1 is raised up in this case, the delay relay 31 is immediately deactuated by the output voltage of the detecting circuit 20 and the switches 32, 34 are switched whereby the excitor 8 is not actuated by turning on the heat adjusting switch 15. Accordingly, an attractive force is not applied to the cooking pot 1 and an accidental dropping of the cooking pot does not occur.

When the cooking operation is continued, the cooking pot 1 is returned to its normal position on the excitor 8 and the main switch 11 is reset whereby the output voltage of the detecting circuit 20 returns to the normal operation state.

In the embodiment of FIG. 5 using the thyristor 35 as the switching element, the thyristor 35 is turned on by detecting the abnormal condition at the beginning of or during operation and maintains its ON state. Accordingly, even through the abnormal condition is corrected to the normal condition, the drive circuit 28 continues the operation and is not automatically returned. In order to return the drive circuit, the main switch 11 is reset or a reset switch (not shown) is reset.

When the thyristor 35 is replaced by a transistor in the embodiment of FIG. 5, the drive circuit 28 is automatically released by correcting the abnormal condition to the normal condition. Since the delay relay 31 is connected, the excitor 8 is not immediately actuated by returning the cooking pot 1 to the excitor. Thus, time is afforded for placing the cooking pot 1 at the normal position. Thus, the generation of an attractive force which can cause dropping of cooking pot 1 is prevented. When the main switch 11 is switched when cooking pot 1 is in a raised position, the attractive force is not immediately applied to the cooking pot 1.

In this embodiment, it is clear that the dropping transformer 30 can be replaced by a circuit wherein the voltage drop is achieved by resistor, inductor or other suitable element. When the heat adjusting switch 15 which is a bimetal element including the heater 13 is connected between the main switch 11 and the delay relay 31, the operation is substantially the same as that of the operation of the embodiment of FIG. 5.

FIG. 6 and FIG. 7 show another embodiment according to the invention. Only the structures different from those of the embodiment of FIG. 5 will be described.

The embodiment of FIG. 5 comprises the detecting circuit 20 wherein the series circuit of the excitation windings 3, 4 of the excitor 8 and the capacitor 7 is connected in parallel to the series circuit of the mimic winding 16 and the capacitor 17 so as to generate as an output the voltage detected between the output terminals 18, 19 in the middle of both series circuits and is similar to the embodiment of FIG. 4. Accordingly, it is necessary to use two monopolar double throw delay switches 32, 34 in order to switch both the applied voltage and the detected voltage.

On the contrary, in the embodiment of FIGS. 6 and 7, the detecting circuit is separated from the circuit of the excitor so as to permit use of only one monopolar single throw delay switch. In FIG. 6 and FIG. 7, the reference 40 designates a detecting device which comprises detector cores 41 disposed to face the cooking pot 1 as do the excitation cores 2; detector windings 42 and a capacitor 43 connected in series to the detector windings 42. A small current is passed to the detecting device so as not to apply an attractive force to the cooking pot 1.

The references 44 and 45 are respectively a mimic winding and a capacitor. The detecting circuit 46 is formed by the mimic winding 44, the capacitor 45, the detector winding 42 and the capacitor 43. The values of the elements are determined so as not to apply a voltage between the output terminals 47, 48 of the detecting circuit 46 in the normal operation the same as the detecting circuit 20. The reference 49 designates a delay relay driving circuit which comprises a resistor 50 and a relay 36. However, it is preferable to use a diode bridge for detecting voltage rectification 33 through the switching element 35 as shown in FIG. 5 instead of the resistor 50 in order to prevent chattering.

The reference 37 designates a normally ON switch of a delay relay circuit 51 controlled by a delay relay driving circuit 49; 52 designates a delay relay controlled by a switch 37; 53 designates a normally OFF switch of the delay relay 52 which is connected with the main switch in series to the excitor 8.

The operation of this embodiment will now be described. When the main switch 11 is turned on, under the above-mentioned abnormal operation state, the voltage is applied between the output terminals 47, 48 of the detecting circuit 46, and the relay 36 of the delay relay driving circuit 49 is actuated to turn off the normally ON switch. Accordingly, the normally OFF switch 53 of the delay relay 52 is kept in the OFF state and the power voltage is not applied to the excitor 8.

When there is no abnormal operation, the voltage is applied to the detecting circuit 46. However, the voltage between the output terminals 47, 48 is substantially zero. Accordingly, the delay relay driving circuit 49 is not actuated to keep the normally ON switch 37 in its ON state. The normally OFF switch is turned on by the delay relay 52 after a predetermined delay time. Accordingly, the power voltage is applied to the excitor to heat the cooking pot 1.

It is believed clear from the illustration of the operation that the protective device attains the same effect as that of the embodiment of FIG. 5, even when an abnormal state occurs during normal operation or the cooking pot 1 is raised up or is placed on in the OFF state of the heat adjusting switch 15 or the main switch 1 is switched while the cooking pot 1 is held near the excitor 8.

In the embodiments of FIGS. 6 and 7, it is possible to commonly use the excitation core 2 of the excitor 8 as the detector core 41 without providing for a separate detector core 41. In the embodiment of FIG. 5 having the detecting circuit 20 and the embodiment of FIG. 7 having the detecting circuit 46, the mimic winding 16 or 44 can be replaced by another impedance element such as a reactor or a resistor and a similar effect can be attained.

In the embodiment of FIG. 5, the change of current passing through the excitation windings 3, 4 which is caused by the abnormal condition of the heating element is detected by using the capacitor 7 to provide a predetermined phase difference between the two groups of the excitation windings 3, 4 and the excitation windings 5, 6. However, as shown in FIG. 8, a current detecting element 70 such as another impedance element (a resistor or an inductor) or the primary winding of the transformer can be connected in series to the group of excitation windings 5, 6 without a capacitor 7 so as to operate the driving circuit instead of as shown in FIG. 5, to obtain the same results.

Figure 8:
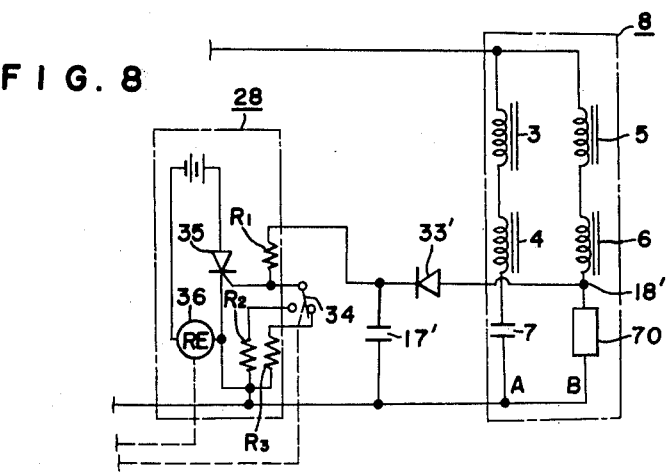
FIG. 8 is a diagram of a part of a circuit of a modification to the circuit of FIG. 5.

In FIG. 8, the same parts are respectively designated by the same references and corresponding parts are respectively designated by the same references with the addition of a prime. In FIG. 8, the impedance element of the mimic winding 16 is not used. However, it is possible to connect an impedance element as shown in FIG. 5.

In accordance with the protective device of the invention, accidents in the operation of the induction heating apparatus can be positively prevented and a reliable induction heating apparatUs posing no dangers to the operator may be realized.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A protective device for induction heating apparatus comprising:
   a specific heating element for holding a substance to be cooked,
   an excitor for induction heating the specific heating element,
   means for applying an operating voltage to the excitor,
   a power switch for turning on the excitor,
   means for delaying the application of the operating voltage to the excitor for a predetermined time after the turning on of the power switch,
   means for detecting immediately after the turning on of the power switch and thereafter the presence of a heating element other than the specific heating element, the absence of the specific heating element of any other heating element or an undesirably high temperature of the specific heating element,
   means for preventing the application of operating voltage to the excitor in response to detection of the presence of a heating element other than the specific heating element, the absence of the specific heating element or any other heating element or an undesirably high temperature of the specific heating element,
   the detecting device comprising a first series circuit of a detector winding wound on a detector core for forming a magnetic flux circuit with the heating element to impart a weak attractive force and a capacitor connected to the detector winding and a second series circuit of a mimic winding and a capacitor which is connected in parallel to the first series circuit to pass current having substantially the same phase as that of the current passing through the first series circuit during normal operation, and means for preventing the passage of current to the excitation windings of the excitor for the predetermined time for detecting the presence of a heating element other than the specific heating element, the absence of the specific heating element or any other heating element or an undesirably high temperature of the specific heating element.

2. A protective device for induction heating apparatus according to claim 1 wherein the mimic winding is an impedance element.

* * * * *

UNITED STATES PATENT AND TRADEMARK OFFICE
CERTIFICATE OF CORRECTION

PATENT NO. : 4,015,084
DATED : March 29, 1977
INVENTOR(S) : TSUMORI ET AL

It is certified that error appears in the above-identified patent and that said Letters Patent are hereby corrected as shown below:

Sheets 1 and 2 of the Drawings, Figures 1, 2 and 4, delete "Prior Art" and insert therefor --Prior Invention--.

Signed and Sealed this

Twenty-seventh Day of June 1978

[SEAL]

Attest:

RUTH C. MASON
*Attesting Officer*

DONALD W. BANNER
*Commissioner of Patents and Trademarks*